(12) United States Patent
Iino et al.

(10) Patent No.: US 7,206,644 B2
(45) Date of Patent: Apr. 17, 2007

(54) METHOD AND SYSTEM FOR OPTIMIZING OPERATION SCHEDULE OF PLANT

(75) Inventors: Yutaka Iino, Kawasaki (JP); Akinori Kamito, Hino (JP); Shunji Hosaka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 230 days.

(21) Appl. No.: 11/089,360

(22) Filed: Mar. 25, 2005

(65) Prior Publication Data
US 2005/0246039 A1 Nov. 3, 2005

(30) Foreign Application Priority Data
Mar. 26, 2004 (JP) ............... 2004-093281

(51) Int. Cl.
G05B 13/02 (2006.01)
G06F 11/30 (2006.01)
G06F 15/18 (2006.01)
G06F 9/44 (2006.01)
F01K 13/02 (2006.01)

(52) U.S. Cl. ............... 700/36; 700/30; 700/49; 702/182; 705/7; 706/14; 60/646; 60/660

(58) Field of Classification Search ............ 700/28–34, 700/36, 44, 49, 286–288; 702/182–184; 705/7–11, 400; 706/12–14; 60/645, 660
See application file for complete search history.

(56) References Cited

U.S. PATENT DOCUMENTS 4,466,383 A * 8/1984 Klatt et al. ............... 122/379
5,467,265 A * 11/1995 Yamada et al. ............ 700/49
5,873,251 A * 2/1999 Iino ........................ 60/660
6,105,520 A * 8/2000 Frazer et al. .............. 112/117
6,230,495 B1 * 5/2001 Benesch et al. ........... 60/660

(Continued)

FOREIGN PATENT DOCUMENTS

JP        08-128305 A        5/1996

(Continued)

OTHER PUBLICATIONS

T. Ibaraki et al., "Optimization Method," Kyoritsu Shuppan press, Feb. 2, 1995, Chapter I, pp. 5-34 and Chapter IV, pp. 105-143.

(Continued)

Primary Examiner—Crystal J. Barnes
(74) Attorney, Agent, or Firm—Foley & Lardner LLP

(57) ABSTRACT

A plant-operation-schedule optimization system includes a data inputting device transmitting a future operation planned value of at least one plant to be controlled; an operation-data inputting device transmitting operation data concerning the plant; and an operation-schedule calculating unit receiving the operation planned value and the operation data concerning the plant from the data inputting device and the operation data inputting device, respectively, to calculate an optimized operation schedule of the plant. The operation-schedule calculating unit includes an optimization calculator calculating the optimized operation schedule; and a database storing the kind of an operation mode, an operation pattern, and an operation cost according to the operation mode of the plant. The data stored in the database is referred to in the calculation of the optimized operation schedule in the optimization calculator.

13 Claims, 7 Drawing Sheets

U.S. PATENT DOCUMENTS

| | | | |
|---|---|---|---|
| 6,681,155 B1 * | 1/2004 | Fujita et al. | 700/287 |
| 6,898,488 B2 * | 5/2005 | Kusaka et al. | 700/286 |
| 2002/0049563 A1 * | 4/2002 | Vetter et al. | 702/184 |
| 2004/0230541 A1 * | 11/2004 | Lefton et al. | 705/400 |
| 2005/0015283 A1 * | 1/2005 | Iino et al. | 705/4 |
| 2005/0065826 A1 * | 3/2005 | Baker et al. | 705/7 |
| 2006/0241986 A1 * | 10/2006 | Harper | 705/7 |

FOREIGN PATENT DOCUMENTS

| | | | |
|---|---|---|---|
| JP | 2001255925 A | * | 9/2001 |
| JP | 2002-300720 A | | 10/2002 |
| JP | 2004171548 A | * | 6/2004 |

OTHER PUBLICATIONS

M. Ohshima et al., "Journal of System, Control and Information," Model Predictive Control-I, May 2002, (ISCIE) vol. 46, No. 5, pp. 286-293.

H. Konno et al., "Integer Programming and Combination Optimization," Nikka-Giren press, Jan. 12, 1996, Chapter IV, pp. 49-80.

* cited by examiner

| OPERATION MODE No. | OPERATION MODE | OPERATION PATTERN | OPERATION COST |
|---|---|---|---|
| 1 | COLD START | y1, y2, ..., yn<br>u1, u2, ..., un | ¥1,000,000 |
| 2 | HOT START | y1, y2, ..., yn<br>u1, u2, ..., un | ¥400,000 |
| 3 | EMERGENCY STOP | y1, y2, ..., yn<br>u1, u2, ..., un | ¥200,000 |
| ... | ... | ... | ... |

METHOD AND SYSTEM FOR OPTIMIZING OPERATION SCHEDULE OF PLANT

CROSS REFERENCE TO RELATED APPLICATIONS

This application claims benefit of priority under 35USC 119 to Japanese Patent Application No. 2004-93281,filed on Mar. 26, 2004, the contents of which are incorporated herein by reference.

BACKGROUND OF THE INVENTION

1. Field of the Invention

The present invention relates to a method of optimizing an operation schedule of a plant and a system therefore, the method and system calculating an optimized operation schedule, including the startup and shutdown, of the plant or an item in the plant.

2. Description of the Related Art

Various operation management systems using optimized-operation scheduling methods or optimal control methods are suggested for power plants, including combined cycle power plants, thermal power plants, and atomic power plants, and the items in the power plants in order to optimize the economic efficiency or the operation efficiency.

The operation management systems include an operation schedule optimization method using a model predictive control disclosed in Non-patent Document 1 described below. In this method using the model predictive control, a control algorithm that allows for the dynamic characteristic model, the future desired value (operation planned value), and the operation constraints of a plant to be controlled to calculate an optimized manipulation signal sequence having a minimum evaluation function is adopted.

FIG. 9 is a diagram schematically showing the structure of a model predictive control method used in a known operation management system. This operation management system applies the manipulated variable and the controlled variable of a plant or system, to be controlled, to the predictive model so as to perform the optimization calculation and optimizes the operation of the plant in the basis of the predicted response.

Japanese Unexamined patent application Publication No. 2002-300720 (Patent Document 1) discloses an optimization mechanism allowing for the startup and shutdown of an electric generator, which is an item in a plant. The constraints, including the startup time constraint and the shutdown time constraint, relating to the startup and shutdown of the electric generator are considered in this optimization mechanism, and parameters in which the constraints, the fuel cost, the startup cost, the shutdown cost, and others are consolidated are included in a physical model to determine the startup and shutdown plan of the electric generator by optimization calculation so as to minimize the operation cost, including the amount of fuel, of the electric generator.

Upon startup and shutdown of a power plant or an item in the power plant, for example, a physical-model-based optimization method disclosed in Japanese Unexamined Patent Application Publication No. 8-128305 (Patent Document 2) is adopted. In this optimization method, the plant life is considered and a startup and shutdown operation pattern requiring a minimum time is determined by solving a physical-model-based nonlinear optimization equation based on the thermal stress control conditions affecting the plant item.

In such operation management systems, various optimization methods introduced in Non-patent Document 2 described below are adopted in the optimization calculation for optimizing the operation of a plant or an item in the plant, and an integer programming method and a mixed integer programming method introduced in Non-patent Document 3 described below are used in an operation schedule optimizing equation allowing for the startup and shutdown of a plant or an item in the plant.

Non-patent Document 1: Masahiro Ohshima and Morimasa Ogawa, "Model Predictive Control -I" Systems, Control and Information 46(5) 2002: 286–293

Non-patent Document 2: Toshihide Namiki and Masao Fukushima, Saitekika no Shuho (Kyoritsu Shuppan 2001), I (5–34) and IV (105–143)

Non-patent Document 3: Hiroshi Konno and Hisatoshi Suzuki, Seisukeikakuho oyobi Kumiawase Saitekika (Nikkagiren 1999) IV (49–80)

Since the manipulated variables (independent variables) are the continuous quantity determining the operating conditions of a plant in the operation schedule optimization method using a known model predictive control disclosed in Non-patent Document 1, optimized scheduling allowing for the event behavior, such as the startup and shutdown, of the plant is not realized.

An preparation device of a startup and shutdown plan of a generator, disclosed in Patent Document 1, performs the optimization allowing for the startup and shutdown constraints of the generator. In this optimization, the operation method upon startup and shutdown of the plant (generator) is determined by optimization calculation using model parameters in which the startup and shutdown constraint times are consolidated. Although an optimized operation pattern is determined based on the physical constraints, such as security, safety operation, thermal stress, and material strength, of a plant item when the plant is actually started up, the physical constraints are not considered in the Patent Document 1. Accordingly, the device disclosed in Patent Document 1 is not suitable for the operation method upon startup of the plant.

Furthermore, in a system and method of controlling startup of a thermal plant, disclosed in Patent Document 2, the plant is started up while determining the startup pattern by optimization calculation using a detailed physical model. Hence, an enormous amount of calculation is required in the system and method and it is difficult to rapidly start up the plant due to the long calculation time.

SUMMARY OF THE INVENTION

It is an object of the present invention to provide a method of optimizing an operation schedule of a plant and a system thereof, the method and system being capable of rapidly and accurately calculating an optimized operation schedule with a little amount of calculation while allowing for an optimized operation pattern and an operation cost in the optimized operation pattern upon startup of the plant.

The present invention provides, in its first aspect, a plant-operation-schedule optimization method of calculating an optimized operation schedule having a cost evaluation function based on a characteristic model, an operation constraint, and operation planned values from the present to the future of at least one plant to be controlled. An operation mode variable meaning the kind of an operation mode of the plant is included as one of independent variables in the calculation of the operation schedule optimization. An operation pattern determined in advance according to the operation mode variable is set as an operation constraint. The calculation of the operation schedule optimization of the plant is performed such that an operation cost for every operation mode or an operation cost when the operation mode is changed is minimized in the cost evaluation function.

In the plant-operation-schedule optimization method, the kind of the operation mode, the operation pattern, and the operation cost according to the operation mode of the plant to be controlled is preferably stored in a database separated from an optimization calculator, and the database is preferably referred to in the calculation of the operation schedule optimization of the plant in the optimization calculator. In addition, it is preferable that an optimized operation pattern in a specific operation mode and the operation cost in the optimized operation pattern be calculated by optimization calculation using a model of the plant to be controlled, and that the database storing the kind of the operation mode, the operation pattern, and the operation cost according to the operation mode be updated with the calculated optimized operation pattern and operation cost.

The present invention provides, in its second aspect, a plant-operation-schedule optimization system including a data inputting device transmitting a future operation planned value of at least one plant to be controlled; an operation-data inputting device transmitting operation data concerning the plant; and an operation-schedule calculating unit receiving the operation planned value and the operation data concerning the plant from the data inputting device and the operation data inputting device, respectively, to calculate an optimized operation schedule of the plant. The operation-schedule calculating unit includes an optimization calculator calculating the operation schedule optimization; and a database storing the kind of an operation mode, an operation pattern, and an operation cost according to the operation mode of the plant to be controlled, and the data stored in the database is referred to in the calculation of the optimized operation schedule in the optimization calculator.

In the plant-operation-schedule optimization system, it is preferable that the operation-schedule calculating unit be electrically connected to a data processing unit processing optimization result obtained in the calculation of the operation schedule optimization in the optimization calculator. The data processing unit preferably includes a data storage storing the optimization result supplied from the optimization calculator; and a data selector selecting data required for the optimization calculation in the operation-schedule calculating unit from the data stored in the data storage to output the selected data as optimization input data.

In the plant-operation-schedule optimization system, the operation-schedule calculating unit preferably includes a characteristic expression setter setting a characteristic expression of the plant to be controlled or an operating condition and outputting the set characteristic expression; a constraint expression setter setting a constraint expression, relating to an upper or lower limit or the rate of change of the plant, and outputting the set constraint expression; a special cost setter setting a special cost and outputting the set special cost; a mode selection expression setter setting a mode selection expression used for determining and selecting the operation mode of the plant and outputting the set mode selection expression; a total-cost computation expression setter setting a total cost expression used for calculating a total cost of the operation of the plant and outputting the set total cost expression; an optimization ancillary-data inputting device setting the value of a variety of data required for the optimization calculation in the operation-schedule calculating unit and outputting the set value as optimization ancillary data; an optimization ancillary-data storage receiving and storing the optimization ancillary data supplied from the optimization ancillary-data inputting device and outputting the stored data as the optimization ancillary data if required; and an optimization calculator calculating an optimized operation schedule having a minimum cost evaluated with the total cost expression based on the characteristic expression supplied from the characteristic expression setter, the constraint expression supplied from the constraint expression setter, the special cost supplied from the special cost setter, the mode selection expression supplied from the mode selection expression setter, the total cost expression supplied from the total-cost computation expression setter, and the optimization ancillary data supplied from the optimization ancillary-data storage. The optimization calculator preferably supplies an optimization result calculated in the calculation of the optimized operation schedule to a data processing unit.

The plant-operation-schedule optimization method and the plant-operation-schedule optimization system of the present invention, which allow for the optimized operation pattern and the operation cost in the optimized operation pattern upon startup of the plant to be controlled, can rapidly and accurately calculate an optimization operation schedule with a little amount of calculation and can optimize the operation schedule of the plant without a time lag.

DESCRIPTION OF THE PREFERRED EMBODIMENTS

Embodiments of a method and a system of optimizing an operation schedule of a plant of the present invention will be described below with reference to the attached drawings.

Figures 1, 2:
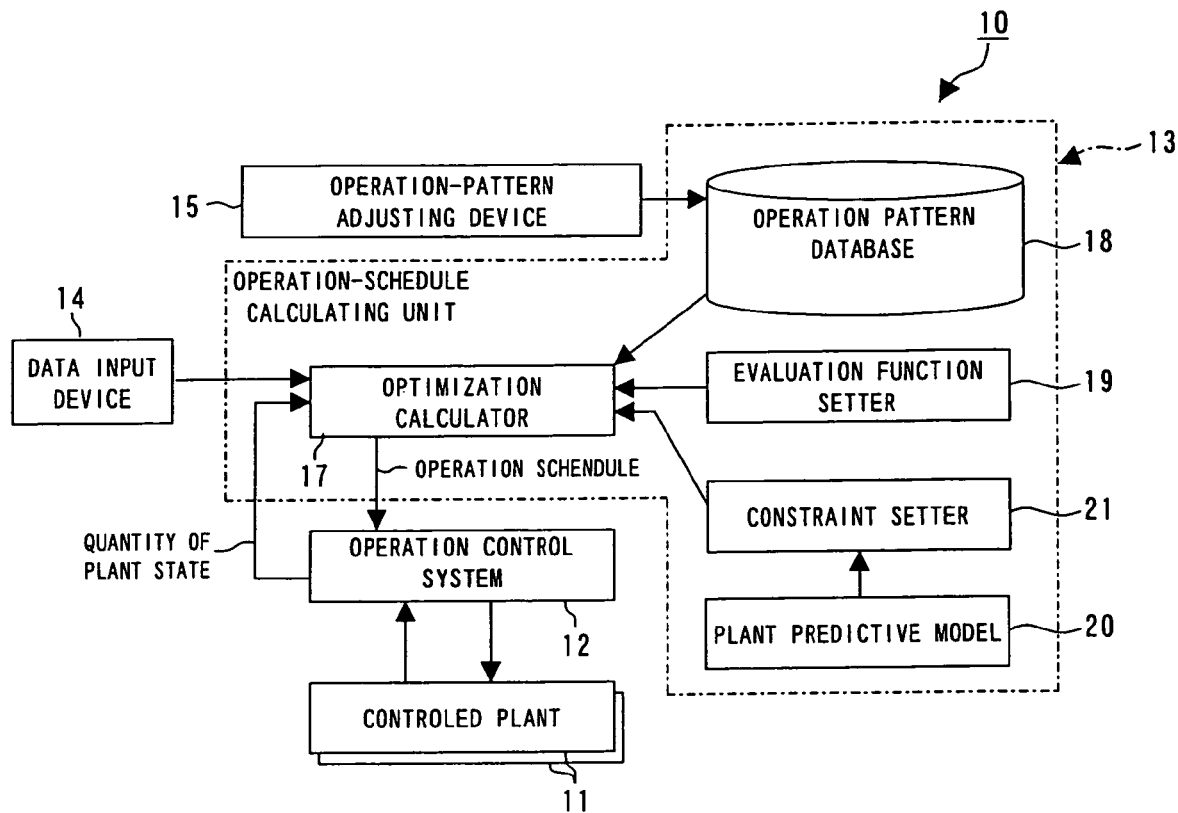
FIG. 1 is a block diagram schematically showing the functional structure of a plant-operation-schedule optimization system according to a first embodiment of the present invention.
FIG. 2 shows an example of a operation pattern provided in the plant-operation-schedule optimization system in FIG. 1.

FIG. 1 is a block diagram schematically showing the functional structure of a plant-operation-schedule optimization system 10 according to a first embodiment of the present invention.

The plant-operation-schedule optimization system 10 is adapted to rapidly calculate an optimized operation schedule of at least one plant or plant item without a time lag. The optimized operation schedule allows for the startup and shutdown of the plant or plant item and the cost thereof. A plant to be controlled (hereinafter, will be referred to as "plant") 11 of the plant-operation-schedule optimization system 10 is a power plant, such as a combined cycle power plant, a thermal power plant, or an atomic power plant, or a plant item, such as a steam turbine, a boiler, or an electric generator.

The plant-operation-schedule optimization system 10 actuates and controls an operation control system 12 for operating and controlling the plant 11. The plant-operation-schedule optimization system 10 includes an operation-schedule calculating unit 13, a data inputting device 14, and an operation-pattern adjusting device 15. The operation-schedule calculating unit 13 receives the quantity of state, such as the pressure, temperature, or flow, of the plant 11 as process data (operation data) from the operation control system 12. The data inputting device 14 is used for inputting an operation planned value of the plant 11 to the operation-schedule calculating unit 13. The operation-pattern adjusting device 15 determines an optimized operation pattern and operation cost for every operation mode by optimization calculation and supplies the determined optimized operation pattern and operation cost to the operation-schedule calculating unit 13.

The operation control system 12 also functions as a process-data collecting system. The operation control system 12 receives the quantity of state, such as the pressure, temperature, or flow, of the plant 11, measured by each sensor in the plant 11, as the process data (operation data) and supplies the quantity of state of the plant 11 to an optimization calculator 17 in the operation-schedule calculating unit 13. The optimization calculator 17 receives the operation planned value from the present to the future of the plant 11 from the data inputting device 14.

The operation-schedule calculating unit 13 includes the optimization calculator 17, an operation pattern database 18, an evaluation function setter 19, and a constraint setter 21. The optimization calculator 17 calculates the optimized operation schedule of the plant 11. The operation pattern database 18 stores operation-related information, including the type of the operation mode, the operation pattern, and the operation cost, on the plant 11 for every operation mode. The evaluation function setter 19 sets an evaluation function for the optimization calculation for optimizing the operation of the plant 11. The constraint setter 21 sets various constraints, including a plant predictive model 20, of the plant 11.

The operation pattern database 18 in the operation-schedule calculating unit 13 is electrically connected to the operation-pattern adjusting device 15. The operation-pattern adjusting device 15 calculates an optimized operation pattern and an operation cost in the optimized operation pattern in a specific operation mode, for example, in cold start, warm start, hot start, or emergency stop (run back or trip), by known optimization calculation. This calculation is performed independent of the optimization calculator 17. The optimized operation pattern and the operation cost in the optimized operation pattern for every operation mode, calculated in the optimization calculation by the operation-pattern adjusting device 15, are supplied to the operation pattern database 18 to be written or updated in the operation pattern database 18.

The operation-pattern adjusting device 15 calculates the optimized operation pattern and the operation cost in the optimized operation pattern for every operation mode at a timing independent of the optimization calculator 17 by the optimization calculation using a detailed known physical model of the plant 11.

The optimization calculator 17 in the operation-schedule calculating unit 13 receives the quantity of state of the plant 11 and the operation planned value from the operation control system 12 and the data inputting device 14, respectively. The optimization calculator 17 in the operation-schedule calculating unit 13 also receives the operation-related information (a characteristic model of the plant 11) for every operation mode, the evaluation function for the optimization calculation, and the various constraints including the plant predictive model 20 from the operation pattern database 18, the evaluation function setter 19, and the constraint setter 21, respectively, and performs the optimization calculation to accurately and precisely determine an optimized operation schedule of the plant 11 with a little amount of calculation.

The operation-related information (the characteristic model of the plant 11), including the type of the operation mode (for example, cold start, hot start, or emergency stop), the operation pattern, and the operation cost according to the operation mode or the change in the operation mode, on the plant 11 is stored in the operation pattern database 18 for every operation mode, as shown in FIG. 2 as an example of the operation pattern.

In order to determine the optimized operation schedule of the plant 11, the optimization calculator 17 calculates a minimum value of a cost evaluation function as the optimization calculation based on information stored in database 18. Upon calculating the optimization calculation, the optimization calculator 17 refers to the operation pattern database 18 which has the information of the characteristic model of the plant 11, the operation constraints, the quantity of state of the plant 11, and the operation planned value from the present to the future.

In the plant-operation-schedule optimization system 10 according to the first embodiment, the optimized operation schedule, including the startup and shutdown of the plant 11, can be simply, easily, and accurately determined with a little amount of calculation by the operation-schedule calculating unit 13, particularly by the optimization calculator 17. An optimized operation schedule signal calculated by the optimization calculator 17 is supplied to the operation control system 12. The operation control system 12 operates and controls the plant 11, including the startup and shutdown thereof, based on the supplied optimized operation schedule signal so as to optimize a controlled variable (output) of the plant 11.

The operation of the plant-operation-schedule optimization system 10 will now be described.

In the plant-operation-schedule optimization system 10, the operation-schedule calculating unit 13 performs the optimization calculation so as to calculate the minimum value of the cost evaluation function based on the characteristic model of the plant 11, the operation constraints, the operation planned value from the present to the future, and the quantity of state of the plant 11 in order to determine the optimized operation schedule of the plant 11. The operation-schedule calculating unit 13 sequentially refers to and uses the operation pattern stored in the operation pattern database 18 in the calculation of the optimized operation schedule in the optimization calculator 17 to rapidly determine the optimized operation schedule with a little amount of calculation.

In the plant-operation-schedule optimization method described above, the optimization calculation uses integer operation mode variables meaning the types of the multiple operation modes of the plant 11 as one of independent variables.

The operation-schedule calculating unit 13 is provided with the constraint setting unit for setting an operation pattern determined in advance in accordance with the operation mode variable and the optimization evaluating unit for evaluating the operation cost for every operation mode or the operation cost when the operation mode is changed in the cost evaluation function.

Specifically, the plant-operation-schedule optimization method when the plant 11 is a power plant is expressed as follows:

[Formula 1]

$$J = \Sigma\{Cost(Y_i, U_i) + \delta i\text{-start}*Cost\text{-}i(Start) + \delta i\text{-stop}*Cost\text{-}i(Stop)\} \quad (1)$$

is set as an evaluation function J, under the following constraints:

$$\begin{aligned}
&\text{Constraints Demand } MW(t+k) = \Sigma Yi(t+k) \\
&\quad \text{wherein } k = 1, 2, \ldots, m \\
&\text{Characteristic model} \\
&\quad Yi(t) = fi\{Ui(t)\} \\
&\quad \text{wherein } i = 1, 2, \ldots, m \\
&\text{Operational constraint} \\
&\quad Y\min \leq Yi(t) \leq Y\max \\
&\quad U\min \leq Ui(t) \leq U\max
\end{aligned} \quad (2)$$

$$\begin{aligned}
&\text{if } \delta_{i-start} = 1 \text{ then } Yi(t+1) = Ystart(1), Yi(t+2) \\
&\quad = Ystart(2), \ldots, Yi+(t+m) = Ystart(m) \\
&\text{if } \delta_{i-stop} = 1 \text{ then } Yi(t+1) = Ystop(1), Yi(t+2) \\
&\quad = Ystop(2), \ldots, Yi+(t+m) = Ystop(m),
\end{aligned} \quad (3)$$

wherein
time t
the controlled variables (outputs) of the plant
Yi (t), . . . , Yn (t)
wherein n denotes the number of channels, for example, the number of electric generators
the continuous manipulated variables (inputs, independent variables) of the plant
Ui (t), . . . , Un (t)
as the operation mode of the plant:
integer variable representing the startup
δi·start=0,1 (0: non-startup mode, 1: startup mode)
integer variable representing the shutdown
δi·stop=0,1 (0: non-shutdown mode, 1: shutdown mode),
startup operation pattern
Ystart(1), . . . Ystart(m)
shutdown operation pattern
Ystop(1), . . . Ystop(m)
operation planned value
demand MW(t+k)=ΣYi(t+k)
wherein k=1, 2, . . . , m, and
operation cost
at regular time Cost(Yi,Ui)
on startup Cost·i(Start)
on shutdown Cost·i(Stop).

The controlled variable Yi(t) of the plant, the continuous manipulated variable Ui(t) of the plant, and δi·start(t) and δi·stop(t), which mean the startup and shutdown plans in the plant operation, are determined by the optimization calculation for every time t as the operation schedule giving a minimum evaluation function J under the above constraints.

For example, a known mixed integer programming (refer to Non-patent Document 3) is used in the optimization calculation.

Since the above optimization calculation involves a great deal of calculation, it is necessary to simplify the expressions. Including a known physical model of the plant in the constraints or the evaluation function provides nonlinear mixed integer programming, which requires an enormous amount of calculation. Accordingly, this inclusion is not practical for the critical plant operation requiring real time control.

In the plant-operation-schedule optimization system 10, the following patterns are calculated in advance as the optimum operation pattern of the plant 11 by the operation-pattern adjusting device 15, which is independent of the optimization calculator 17:

[Formula 2]

$$\text{Startup operation pattern } [Y_{start}(1), Y_{start}(2), \ldots, Y_{start}(m)] \quad (4)$$

$$\text{Shutdown operation pattern } [Y_{stop}(1) \, Y_{stop}(2), \ldots, Y_{stop}(m)] \quad (5)$$

These startup and shutdown operation patterns are calculated at arbitrary timings by the operation-schedule calculating unit 13. The calculation results are stored in the operation pattern database 18. Accordingly, only referring to the startup and shutdown operation patterns stored in the operation pattern database 18 and loading the startup and shutdown operation patterns, the optimization calculator 17 can calculate the optimized operation schedule of the plant 11. The optimization calculator 17 can rapidly find a solution of the optimized operation schedule in almost real time.

The operation pattern of the plant 11 and the operation cost Cost·i(Start) and Cost·i(Stop) in the operation pattern can be separately calculated at arbitrary timings by the separate operation-pattern adjusting device 15.

Since the operation-pattern adjusting device 15 can perform the optimization calculation offline, as background processing, or in a computer different from the one performing the optimization calculation in the optimization calculator 17, the optimization calculation is not affected by the optimization calculator 17. In addition, the operation pattern can be updated according to various conditions, including external environmental conditions and deterioration of the plant caused by aging, and the updated operation pattern can be constantly stored in the operation pattern database 18.

Constantly updating the optimization calculation in the operation-pattern adjusting device 15 and storing the updated optimized calculation function in the operation pattern database 18 allow a solution of the optimized operation schedule to be found at any time in real time by the optimization calculator 17. In the operation-pattern adjusting device 15, the optimization calculation using a known physical model, for example, the calculation of the optimized operation schedule disclosed in Patent Document 1, is performed.

In the plant-operation-schedule optimization system and method described above, the optimized operation schedule can be calculated by the optimization calculation allowing for a response pattern (behavior) corresponding to a special event, such as startup or shutdown of the plant to be controlled, as an operational constraint and for the cost in the response pattern.

Since it is sufficient to refer to the operation pattern database 18 to yield the response patterns upon startup and shutdown of the plant and the cost parameter, the optimization calculator 17 can avoid performing an enormous amount of calculation for solving the nonlinear optimization equations of the physical model database in the calculation of the optimized operation schedule of the plant.

The operation pattern database 18 has the separate operation-pattern adjusting device 15 functioning as the optimization tool for the startup and shutdown patterns of the physical model database. With this structure, the data concerning the optimized operation pattern according to the conditions, including the external environmental conditions, the operational conditions, and the deterioration of the plant caused by aging, can be acquired by offline calculation, independent of the optimization calculator 17, and the acquired data can be constantly updated. Consequently, the plant-operation-schedule optimization system 10 can accurately, precisely, and rapidly calculate the optimized operation schedule of the plant 11 without a time lag.

A second embodiment of a method and a system of optimizing an operation schedule of a plant of the present invention will be described below with reference to FIGS. 3 to 8.

Figure 3:
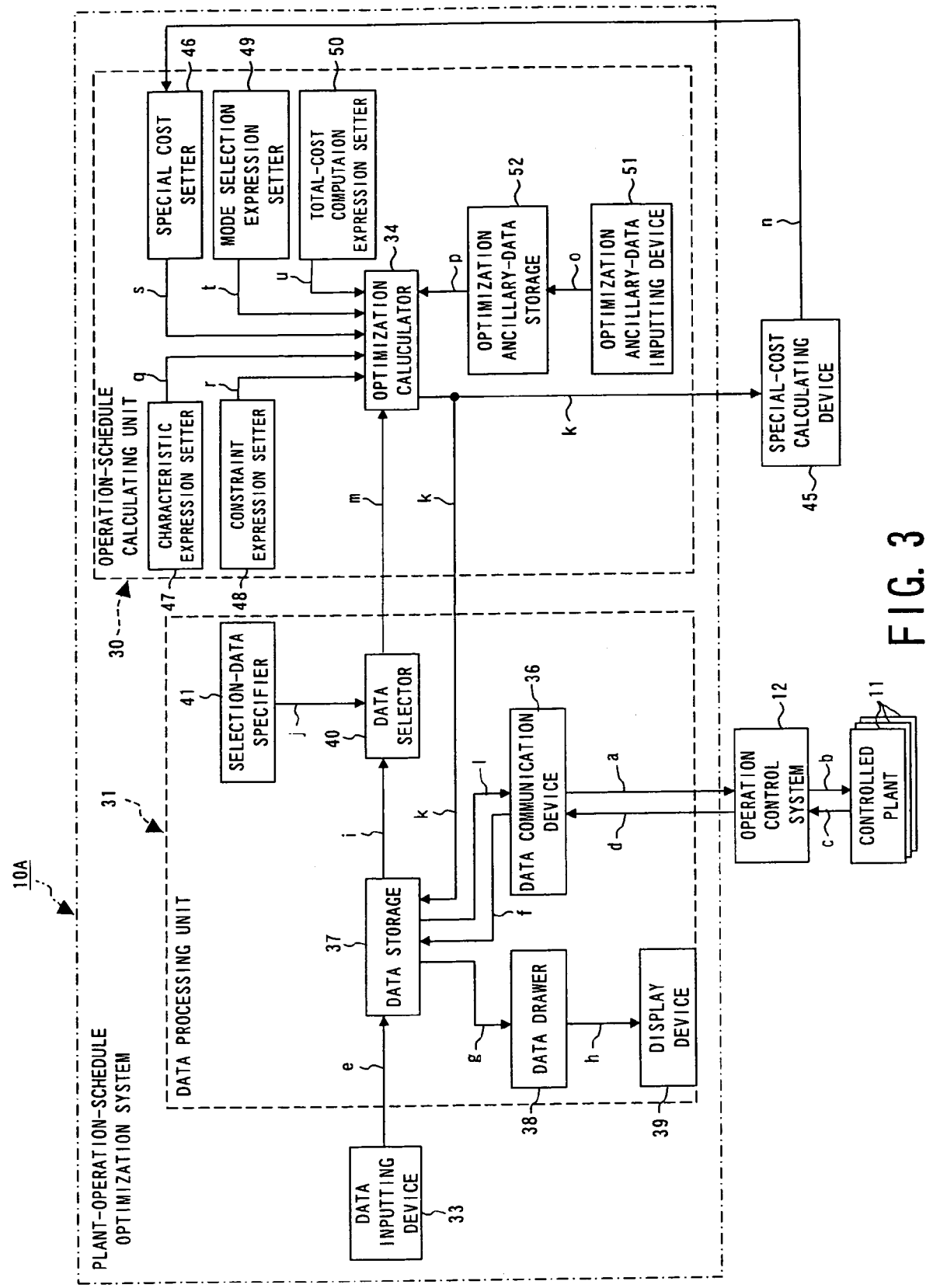
FIG. 3 is a block diagram schematically showing the functional structure of a plant-operation-schedule optimization system according to a second embodiment of the present invention.

FIG. 3 is a block diagram schematically showing the functional structure of a plant-operation-schedule optimization system 10A according to the second embodiment of the present invention. The plant-operation-schedule optimization system 10A in FIG. 3 is an application of the plant-operation-schedule optimization system 10 in FIG. 1. A power plant is exemplified as the plant 11 in FIG. 3.

The same reference numerals are used in the plant-operation-schedule optimization system 10A in FIG. 3 to identify the same components as in the plant-operation-schedule optimization system 10 in FIG. 1. A detailed description of such components is omitted here.

The plant-operation-schedule optimization system 10A mainly includes an operation-schedule calculating unit 30 that performs the optimization calculation to rapidly and accurately determine an optimized operation schedule of the plant 11 with a small amount of calculation and a data processing unit 31 that processes the optimized calculation data given by the calculation of the optimized operation schedule of the plant 11 by the operation-schedule calculating unit 30.

In the plant-operation-schedule optimization system 10A in FIG. 3, an operation-schedule optimization signal a of the plant 11, processed by the data processing unit 31, is supplied to the operation control system 12. The operation control system 12 receives the operation-schedule optimization signal a from the data processing unit 31 and outputs an operation control signal b to operate and control the plant 11. Specifically, the operation control system 12 actuates valves and an actuator (not shown) of the plant 11 to generate power.

The operation control system 12 functions both as a control system for operating and controlling the plant 11 and as a data collecting system for measuring a process amount c, such as a pressure, temperature, or flow, measured by each sensor in the plant 11. The quantity of state of the plant 11, measured by the operation control system 12, is supplied to the data processing unit 31 as process data (operation data) d. The operation data d on the quantity of state of the plant 11 is supplied to an optimization calculator 34 in the operation-schedule calculating unit 30 through the data processing unit 31. In this sense, the operation control system 12 and a data communication device 36 serves as operation-data supplying means for supplying the operation data d to a data storage 37 or to the optimization calculator 34 through the data storage 37.

The data processing unit 31 has a data inputting device 33 with which a user inputs user input data e concerning a future operation planned value of the plant 11. The operation planned value input with the data inputting device 33 is supplied to the optimization calculator 34 in the operation-schedule calculating unit 30 through the data processing unit 31. The optimization calculator 34 corresponds to the optimization calculator 17 in FIG. 1.

The data processing unit 31 includes the data communication device 36, the data storage 37, a data drawer 38, a display device 39, a data selector 40, and a selection-data specifier 41. The data communication device 36 receives the operation data d indicating the quantity of state of the plant 11 from the operation control system 12 controlling the operation of the plant 11. The data storage 37 stores operation data f supplied from the data communication device 36. The data drawer 38 reads out storage data g stored in the data storage 37 and draws the readout storage data g as a graph or a table. The display device 39 displays the graph or table based on a data drawing signal h output from the data drawer 38. The data selector 40 selects data required for calculating the optimized operation schedule in the operation-schedule calculating unit 30 from storage data i stored in the data storage 37. The selection-data specifier 41 supplies data required for the optimization calculation in the operation-schedule calculating unit 30 to the data selector 40 as a data selection signal j.

The data storage 37 in the data processing unit 31 stores the user input data e concerning the operation planned value from the data inputting device 33, the operation data f indicating the quantity of state of the plant 11 from the data communication device 36, and optimization result data k calculated by the operation-schedule calculating unit 30. The data storage 37 supplies an optimization calculation signal l of the stored operation schedule to the data communication device 36, which in turn supplies the operation-schedule optimization signal a to the operation control system 12.

The data storage 37 supplies the optimization calculation signal l of the operation schedule to the data communication device 36 and also supplies the storage data g and the storage data i to the data drawer 38 and the data selector 40, respectively.

The data processing unit 31 supplies an optimized input data signal m processed in the data selector 40 to the optimization calculator 34 in the operation-schedule calculating unit 30.

The operation-schedule calculating unit 30 calculates the optimized operation schedule based on the optimized input data signal m supplied from the data selector 40 and a special cost signal n supplied from a special-cost calculating device 45 functioning as the operation-pattern adjusting means, and supplies the calculation result to the data processing unit 31 and, furthermore, to the operation control system 12 as an optimization result signal k of the operation schedule. The operation-schedule calculating unit 30 is provided with the special-cost calculating device 45 that calculates a special cost based on the optimization result signal k of the plant operation schedule supplied from the operation-schedule calculating unit 30. The special-cost calculating device 45 supplies the calculated special cost signal n to a special cost setter 46 in the operation-schedule calculating unit 30.

The special-cost calculating device 45 is externally attached to the plant-operation-schedule optimization system 10A and has a function equivalent to that of the operation-pattern adjusting device 15 in FIG. 1. The special-cost calculating device 45 performs the optimization calculation using the physical model of the plant 11 to determine an optimized operation pattern in a specific operation mode and an operation cost in the optimized operation pattern, and supplies the optimized operation pattern and the operation cost to the special cost setter 46 as the special cost signal n. The special cost setter 46, which receives the special cost signal n, has a function equivalent to that of the operation pattern database 18 in FIG. 1. The special cost setter 46 stores the information concerning the type of the plant 11, the operation pattern, the operation cost depending on the operation mode or on the change in the operation mode, and the special cost for every operation mode.

The operation-schedule calculating unit 30 includes a characteristic expression setter 47, a constraint expression setter 48, a mode selection expression setter 49, a total-cost computation expression setter 50, an optimization ancillary-data inputting device 51, and an optimization ancillary-data storage 52, in addition to the optimization calculator 34, which has a function equivalent to that of the optimization calculator 17 in FIG. 1, and the special cost setter 46, which receives and stores the optimized operation pattern in a specific operation mode and the operation cost in the optimized operation pattern, supplied from the special-cost calculating device 45, as the special cost signal n and supplies a special cost signal s. The characteristic expression setter 47, serving as a plant predictive model, sets a characteristic expression of the plant 11 or the plant operating condition and outputs a characteristic expression signal q. The constraint expression setter 48, serving as a constraint setter, sets a constraint expression, relating to the upper or lower limit constraint of a controlled variable (output) or the rate-of-change constraint of a manipulated variable (input), of the plant 11 and outputs a constraint expression signal r. The mode selection expression setter 49 sets a mode selection expression used for determining and selecting the type of the operation mode of the plant 11 and outputs a mode selection expression signal t. The total-cost computation expression setter 50, serving as an evaluation function setter, sets a calculation expression used for calculating the total cost of the operation of the plant 11 and outputs a total-cost expression signal u. The optimization ancillary-data inputting device 51 sets the value of a variety of process data of the plant 11 and outputs the set value as an optimization ancillary-data signal o. The optimization ancillary-data storage 52 receives the optimization ancillary-data signal o from the optimization ancillary-data inputting device 51 and supplies the received signal to the optimization calculator 34 as an optimization ancillary-data signal p used as needed.

The optimization calculator 34 in the operation-schedule calculating unit 30 receives the total-cost expression signal u from the total-cost computation expression setter 50; determines an operation schedule having a minimum total cost as the optimized operation schedule based on the characteristic expression signal q from the characteristic expression setter 47, the constraint expression signal r from the constraint expression setter 48, the special cost signal s from the special cost setter 46, the mode selection expression signal t from the mode selection expression setter 49, and the optimization ancillary-data signal p from the optimization ancillary-data storage 52; and supplies the optimized operation schedule to the data storage 37 and the special-cost calculating device 45 as the optimization result signal k of the operation schedule.

Figure 4:
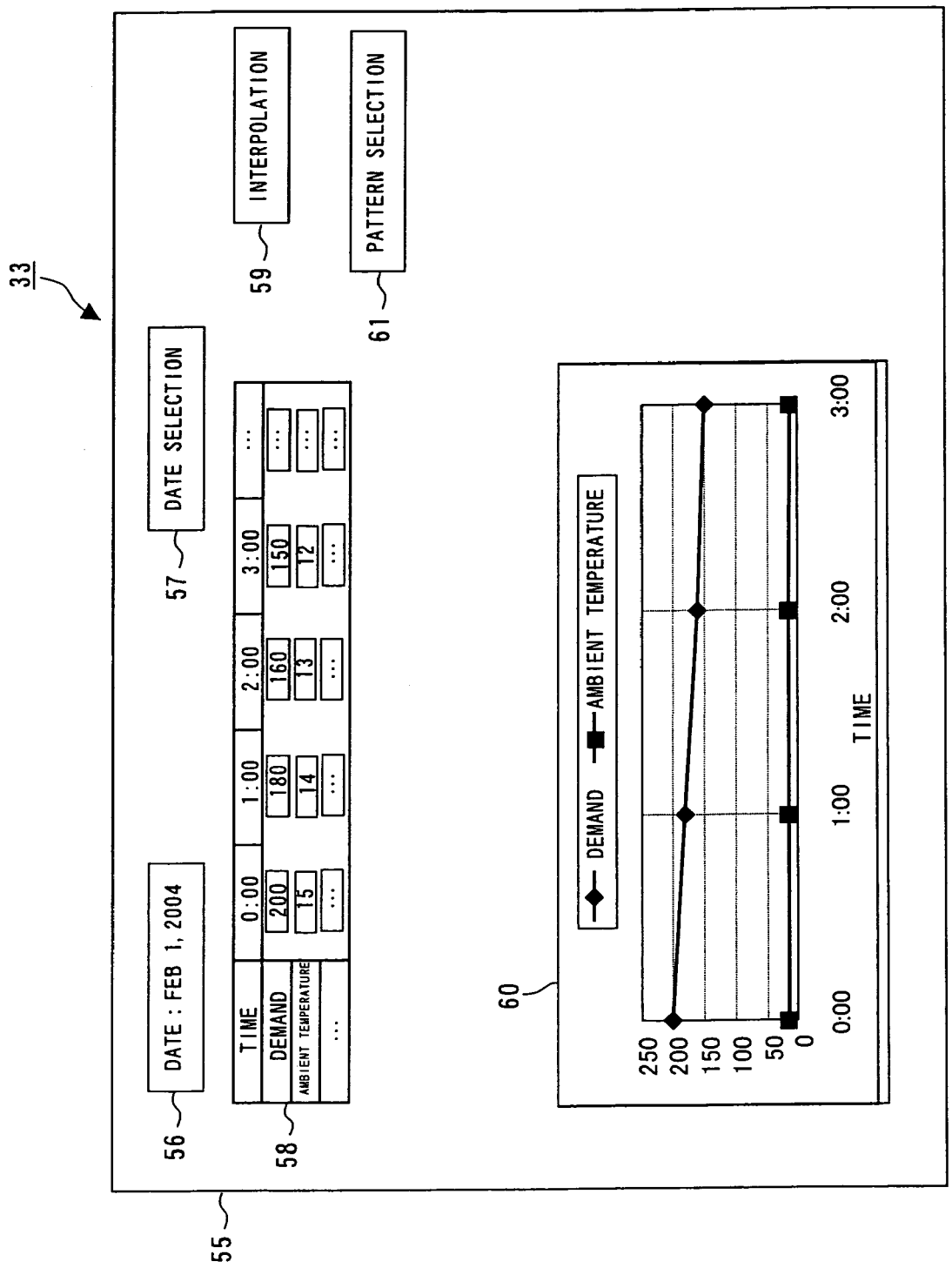
FIG. 4 illustrates a setting screen in a data inputting device provided in the plant-operation-schedule optimization system according to the second embodiment.

The data inputting device 33, with which the future operation planned value is supplied to the data processing unit 31, has multiple setting screens. FIG. 4 illustrates one setting screen 55. The setting screen 55 includes a date display section 56, a date selection section 57, an operation-planned-value input section 58, an interpolation section 59, a graph display section 60, and a pattern selection section 61.

A user of the plant inputs the operation planned values, including a future demand for the generator output and the ambient temperature, in the operation-planned-value input section 58. The input time is displayed in the operation-planned-value input section 58 and the input date is displayed in the date display section 56. Both the date and the time may be displayed in the operation-planned-value input section 58 or in the date display section 56.

The date to be displayed in the date display section 56 is input by the user who presses the date selection section 57 to display a screen for inputting the date.

The value input in the operation-planned-value input section 58 is displayed in the graph display section 60 as a graph.

The interpolation section 59 performs interpolation of the data input by the user. For example, in the operation-planned-value input section 58 in FIG. 4, the cell for the ambient temperature at 2:00 is blank. Pressing the interpolation section 59 allows the value of the ambient temperature at 2:00 to be calculated in the background by $(14+12)/2=13$ using the values 14 and 12 of the ambient temperature at 1:00 and 3:00, respectively, which are input at both sides of the blank cell.

Even when the number of blank cells is two or more, the values of the blank cells can be easily obtained by the interpolation as long as the values at both sides are known.

Even when all the data is not input in the operation-planned-value input section 58 by the user, with several kinds of typical values (operation patterns), such as the demand and/or the ambient temperature, being set in advance, the user can press the pattern selection section 61 to select any of the patterns and to display the value of the selected pattern in the operation-planned-value input section 58. The pattern means data sequence for every time of day from 0:00 to 24:00.

The screen display and operation buttons in the operation-planned-value input section 58 can be easily realized by using a programming language of, for example, a commercially available graphical user interface (GUI). In the programming language, the screen display and the operation buttons are prepared in advance as elements, so that a program can be easily prepared using the elements.

Figure 5:
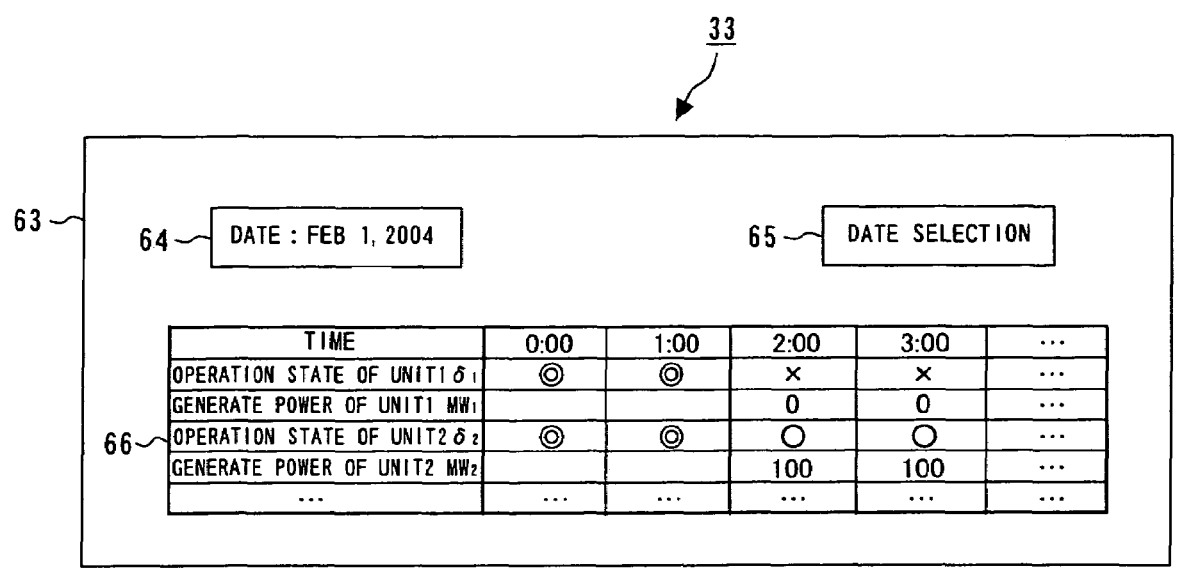
FIG. 5 illustrates another setting screen in the data inputting device provided in the plant-operation-schedule optimization system according to the second embodiment.
Figure 6:
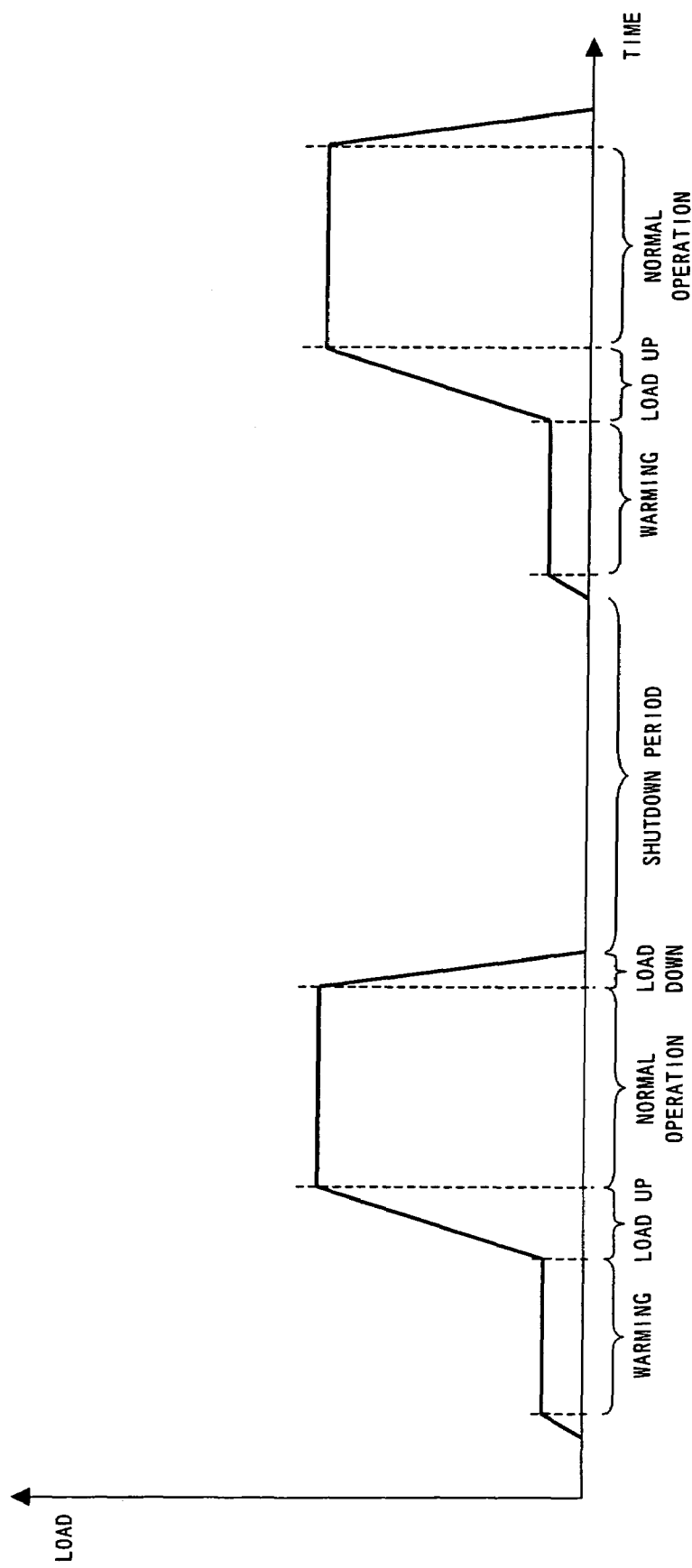
FIG. 6 is a conceptual diagram showing the warming time and the shutdown period of a plant to be controlled.

FIG. 5 illustrates a setting screen 63, which is another setting screen of the data inputting device 33.

The setting screen 63 includes an operation-state specification section 66, a date display section 64, and a date selection section 65.

A user of the plant inputs the future operation planned value of each power generating unit or another item in the plant 11 in the operation-state specification section 66. The input date is displayed in the date display section 64. Both the date and the time may be displayed in the operation-state specification section 66 or in the date display section 64.

The date to be displayed in the date display section 64 is input by the user who presses the date selection section 65 to display a screen for inputting the date.

In the operation-state specification section 66 in FIG. 5, symbols ⊙, ○, and X have the following meanings:

⊙ Determines whether the power generating unit is started up or stopped based on the optimization calculation.

○ Surely starts up the power generating unit and sets the load to a specified value.

X Surely shuts down the power generating unit.

The symbols (⊙, ○, and X) for every time of day, selected by the user of the plant, are processed by the optimization calculator 34 to perform the optimization calculation.

The operation of the plant-operation-schedule optimization system 10A shown in FIG. 3 will now be described.

When the plant 11 is a power plant, the driving of the valves and/or actuator of the plant 11 is controlled based on the operation control signal b supplied from the operation control system 12 to perform the operation control from the startup to the shutdown through the steady-state (rated) operation.

The power plant includes multiple items, such as the boiler, steam turbine, and the electric generator, and the optimization of the operation schedule of the power plant involves, for example, the control of the fuel flow and/or steam flow in the boiler and of the generator output from the steam turbine.

The operation control system 12 supplies the operation control signal b for the control of the optimized operation having the minimum operation cost to the plant 11 in response to the operation-schedule optimization signal a supplied from the plant-operation-schedule optimization system 10A.

The operation control system 12 controls the actuation of the valves and/or actuator based on a built-in control algorithm such that the plant 11 is operated by using the optimized operation schedule as a setting in order to operate the plant 11 according to the optimized operation schedule.

The user of the plant uses the data inputting device 33 to input the future operation planned value to the data processing unit 31 as the input data. The operation planned value is, for example, the demand for the generator output or the predictive value of the ambient temperature in the plant 11. The input data is stored in the data storage 37 as the user input data e.

The operation of the plant-operation-schedule optimization system 10A, that is, the method of optimizing the operation schedule of the plant 11 is performed in the following manner.

The plant-operation-schedule optimization system 10A is not necessarily connected to the operation control system 12. When the plant-operation-schedule optimization system 10A is not connected to the operation control system 12, the operator may manually operate the plant 11 in accordance with the optimized operation schedule displayed in the display device 39.

The process data (operation data) d indicating the quantity of state of the plant 11 may be input to the data inputting device 33 by the operator who, for example, watches a monitoring screen on the display device 39 or reads the value indicated on a meter.

When the operation of the plant 11 is not controlled and the operation schedule is displayed for its guidance, the plant-operation-schedule optimization system 10A may be connected to a plant data collecting device or a data storage device, instead of the operation control system 12.

The data communication device 36 in the data processing unit 31 receives the process data (operation data) d indicating the quantity of state of the plant 11 from the operation control system 12 and supplies the received data to the data storage 37 as the operation data f.

The data storage 37 stores the user input data e from the data inputting device 33, the operation data f from the data communication device 36, and the optimization result data k from the operation-schedule calculating unit 30.

The operation data f from the data communication device 36 is the process data indicating the quantity of state of the plant 11, and the process data includes the generator output at the current time, the operation state of each item in the plant 11, and/or the fuel flow. Since the operation data f is stored in the data storage 37, the operation-schedule calculating unit 30 can read out the operation data at the current time from the data storage 37 as the storage data i and the optimized input data m.

The data storage 37 supplies the storage data i required for the calculation in the operation-schedule calculating unit 30, among the stored data, to the data selector 40.

The data selector 40 selects the data required for the optimization calculation in the operation-schedule calculating unit 30 from among the operation data stored in the data storage 37 and the user input data e, which is the future operation planned value, and supplies the selected data to the operation-schedule calculating unit 30 as the optimized input data m.

Data items required as the optimized input data m includes the current value and a future value of the demand for the generator output of the plant 11, the current value and a future value of the ambient temperature, the current operation state (startup or shutdown) and a future operation planned value (for example, the startup and shutdown can be arbitrarily controlled or the plant item is surely started up or shut down) of the plant item, and the past operation state (started up or shut down).

The data required for the calculation in the operation-schedule calculating unit 30 is specified by the selection-data specifier 41 in the data processing unit 31, and the specified data item is supplied to the data selector 40 as the data selection data j.

The optimized input data m is supplied from the data selector 40 to the operation-schedule calculating unit 30, which performs the optimization calculation required to optimize the operation schedule of the plant 11.

The optimization result data k calculated in the operation-schedule calculating unit 30 is supplied to the data storage 37 in the data processing unit 31. The optimization result data k is read out and is supplied to the data drawer 38 as the storage data g. The data drawer 38 draws the content of the storage data g in the form of a graph or a table and supplies the drawn data to the display device 39 as the data drawing signal h.

The display device 39, which is, for example, a cathode ray tube, a liquid crystal monitor, or a plasma monitor, displays various screens based on the data drawing signal h supplied from the data drawer 38.

The optimization result data k stored in the data storage 37 in the data processing unit 31 is supplied to the data communication device 36 as the optimization calculation signal l of the operation schedule. The data communication device 36 supplies the operation-schedule optimization signal a to the operation control system 12.

The operation control system 12 supplies the operation control signal b to the plant 11 in response to the operation-schedule optimization signal a to control the operation of the plant 11. In the manner described above, the plant 11 is operated in accordance with the optimization result obtained by the optimization calculation in the operation-schedule calculating unit 30.

The operation-schedule calculating unit 30 and the special-cost calculating device 45, which are characteristic components of the plant-operation-schedule optimization system 10A, will now be described.

The following general formulae are used as an objective function and operational constraints in the optimization equations of the operation schedule of the plant 11 to solve the optimization equations of the operation schedule.

[General Formulae of Optimization Equation of Operation Schedule]

[Formula 3]

1. Objective function: $\underset{x(k)}{\text{Min}} \sum_k f(x(k))$ (6)

2. Constraint (equality constraint): $h_i(x(k)) = 0$ (7)

3. Constraint (inequality constraint): $g_j(x(k)) \geq 0$ (8)

wherein x(k) denotes a variable to be optimized,
  k denotes a subscript corresponding to time,
  i denotes a subscript relating to the number of equality constraints, and
  j denotes a subscript relating to the number of inequality constraints The objective function in Expression (6) is to be minimized in the optimization and corresponds to the operation cost, such as the fuel cost, of the plant 11.

The constraint in Expression (7) is an equality to be surely satisfied and is a characteristic expression of the plant 11. The constraint in Expression (8) is an inequality to be surely satisfied and is, for example, the upper or lower limit of a process value of the plant 11.

Expressions (6) to (8) are solved together to obtain the optimization variable x(k) in order to optimize the operation schedule of the plant 11. The optimization variable x(k) corresponds to the operation schedule of the plant 11.

A power plant having two power generating units 1 and 2 will be exemplified as the plant 11. In the power plant, the load distribution between the power generating units 1 and 2 and the operation schedule of the startup and shutdown are to be optimized.

[Specific Example of Optimization Equation of Operation Schedule]

[Formula 4]

1. Objective functions $Cost = Cost1 + Cost2$ (9)

$Cost1 = C^* \sum_k \{Fuel_1(k) + Fuel_2(k)\}$ (10)

$Cost2 = \sum_k \{Con(k) + Coff(k)\}$ (11)

2. Equality constraints

-continued $Con(k) = \sum_i d_i \cdot \delta on_i(k)$ (12)

$Coff(k) = \sum_i e_i \cdot \delta off_i(k)$ (13)

$MW_i(k) = a_i * Fuel_i(k) + b_i * \delta_i(k)$ (14)

3. Inequality constraints $MW\text{min}_i * \delta_i(k) \leq MW_i(k) \leq MW\text{max}_i * \delta_i(k)$ (15)

$-\{\delta_i(k-1) - \delta_i(k)\} \leq \delta on_i(k-1)$ (16)

$\delta_i(k-1) - \delta_i(k) \leq \delta off_i(k)$ (17)

The following variables are used in Expressions (9) to (17):

[Formula 5]
  k ($=N_S, N_{S+1}, \ldots, N_{e-1}, N_e$); a subscript indicating a time
  $N_S$; a calculation step corresponding to the start time
  $N_e$; a calculation step corresponding to the end time
  (a) Variable to be Minimized
    Cost; an objective function and a total operation cost to be minimized
  (b) Variables to be Optimized
    Cost1; a cost relating to the amount of used fuel
    Cost2; a special cost relating to the startup and shutdown operations
      (the special cost is a non-regular cost and includes the startup cost, the shutdown cost, and the standby cost)
    $Fuel_i$; a fuel flow in the i-th power generating unit
    $MW_i$; an electric generator output of the i-th power generating unit
    $\delta_i$; the binary variable of an operation mode indicating whether the i-th power generating unit is started up (=1) or is shut down (=0)
    $\delta on_i$; the binary variable of an operation mode indicating whether the i-th power generating unit is changed from the shutdown to the startup (changed=1, not changed=0)
    $\delta off_i$; the binary variable of an operation mode indicating whether the i-th power generating unit is changed from the startup to the shutdown (changed=1, not changed=0)
    Con(k); an additional cost due to the startup of the power generating unit
    Coff(k); an additional cost due to the shutdown of the power generating unit
  (c) Constants
  The constants are fixed values in the optimization calculation.
    C; a cost constant
    $d_i$; a startup cost constant of the i-th power generating unit
    $e_i$; a shutdown cost constant of the i-th power generating unit
    $a_i$; an electric-generator output characteristic constant of the i-th power generating unit
    $b_i$; an electric-generator output characteristic constant of the i-th power generating unit
    $MW\ \text{min}_i$; an electric-generator output lower limit of the i-th power generating unit
    $MW\ \text{max}_i$; an electric-generator output upper limit of the i-th power generating unit
  The startup cost constant $d_i$ and the shutdown cost constant $e_i$ will now be described with reference to FIG. 6.

The power generating unit, which is the plant 11, needs warming on startup. The warming is performed in order to prevent a rapid change in temperature in the plant items. Without any warming, a rapid change in temperature can cause loss of life or failures of the plant items because, for example, the pipes in the steam system and the steam turbine are made of metal and have a large heat capacity.

The warming period is affected by the down time from the previous shutdown of the plant 11 to this startup thereof. How the plant 11 is cooled down is dependent of the length of the down time, and the power generating unit needs only short-time warming when the power generating unit keeps its warmth.

However, since it is necessary to keep the fuel of, for example, the boiler and the gas turbine burning during the warming period, a long warming period unnecessarily consumes the fuel. The cost of the fuel consumed to start up the plant 11 is denoted by the startup cost $d_i$ and the cost of the fuel consumed to shut down the plant 11 is denoted by the shutdown cost $e_i$.

In order to solve the above optimization equations of the plant 11, the operation-schedule calculating unit 30 operates in the following manner.

The optimization calculator 34 in the operation-schedule calculating unit 30 performs the optimization calculation based on the optimized input data signal m supplied from the data selector 40 in the data processing unit 31, the calculation expressions q, r, u, and t set by the characteristic expression setter 47, the constraint expression setter 48, the total-cost computation expression setter 50, and the mode selection expression setter 49, respectively, and the constants supplied from the special cost setter 46 and the optimization ancillary-data inputting device 51.

The characteristic expression setter 47 sets the equality constraint in Expression (14) and supplies the set equality constraint to the optimization calculator 34 as the characteristic expression q.

The constraint expression setter 48 sets the inequality constraint in Expression (15) and supplies the set inequality constraint to the optimization calculator 34 as the constraint expression r.

The total-cost computation expression setter 50 sets the calculation expressions of the operation cost in Expressions (9) to (11) and supplies the set calculation expressions to the optimization calculator 34 as the total cost expression u.

The mode selection expression setter 49 sets the constraint expressions representing the special operation modes in Expressions (12), (13), (16), and (17) and supplies the set constraint expressions to the optimization calculator 34 as the mode selection expression t.

The special cost setter 46 sets the special costs, including the startup cost $d_i$ and the shutdown cost $e_i$, used in Expressions (12) and (13) set by the mode selection expression setter 49 and supplies the set special costs to the optimization calculator 34 as the special cost s.

Although the characteristic expression setter 47, the constraint expression setter 48, the total-cost computation expression setter 50, and the mode selection expression setter 49 each have a separate setting screen, they do not necessarily have the separate setting screens. For example, the characteristic expression setter 47, the constraint expression setter 48, the total-cost computation expression setter 50, and the mode selection expression setter 49 may separately use a common setting screen or they may be realized in program code without the setting screens.

The optimization ancillary-data inputting device 51 in the operation-schedule calculating unit 30 is used for inputting the data concerning the constants used in the optimization of the operation schedule and the start and end times of the calculation of the optimized operation schedule. The optimization ancillary-data inputting device 51 need not have the setting screen for inputting the data and may describe the input data in a setting file or the like for reading.

The data read in the optimization ancillary-data inputting device 51 is supplied to the optimization ancillary-data storage 52 as the optimization ancillary-data o. Further, the optimization ancillary-data o is supplied to the optimization calculator 34 as the optimization ancillary data p through the optimization ancillary-data storage 52.

The optimization ancillary-data inputting device 51 and the data inputting device 33 may be configured so as to input the data on a common setting screen. In such a case, the optimization ancillary-data storage 52 may be provided in the data storage 37 in the data processing unit 31 as long as the optimization ancillary data is supplied to the optimization calculator 34 through the data selector 40 as the optimized input data m.

Depending on the kinds of the optimization equations of the operation schedule, various algorithms including a simplex method, a Newton's method, and a branch and bound method of solving an integer programming problem (refer to Non-patent Documents 2 and 3) are used in the optimization calculator 34. The optimization equations can also be solved using a commercially available program using these algorithms.

The optimization calculator 34 may be incorporated in the plant-operation-schedule optimization system 10A as optimization package software (optimization calculation tool) in a commercially available program to solve the optimization equations. Alternatively, the optimization equations may be solved by externally setting the constraint expressions and executing an proprietary optimization program.

The special cost n that is calculated by the external-attached special-cost calculating device 45 based on the optimization result k may be set as the special cost s, which is set by the special cost setter 46 in the operation-schedule calculating unit 30.

Figure 7:
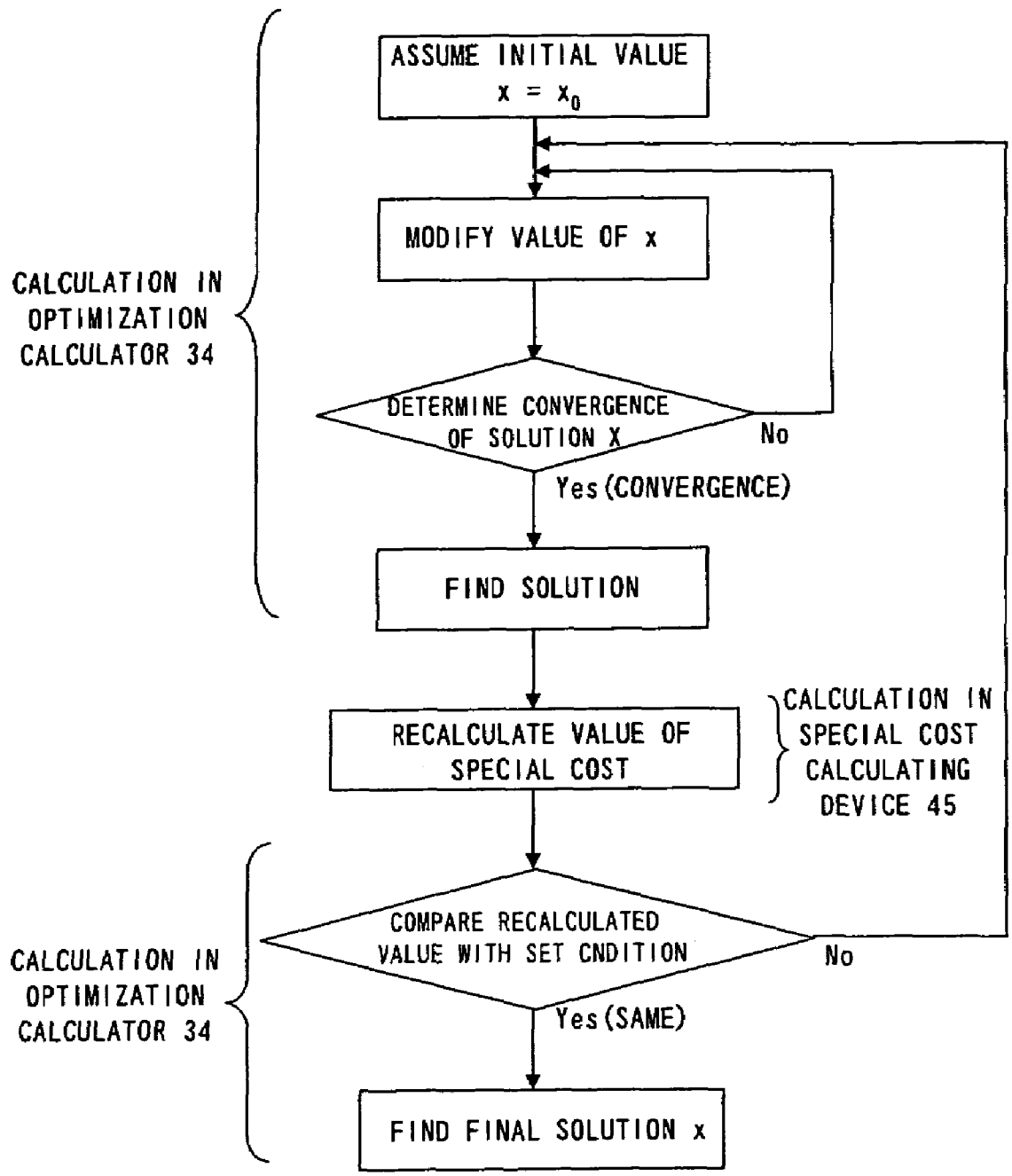
FIG. 7 is a flowchart showing a calculation method performed by a special-cost calculating device and an optimization calculator in the plant-operation-schedule optimization system according to the second embodiment.
Figure 8:
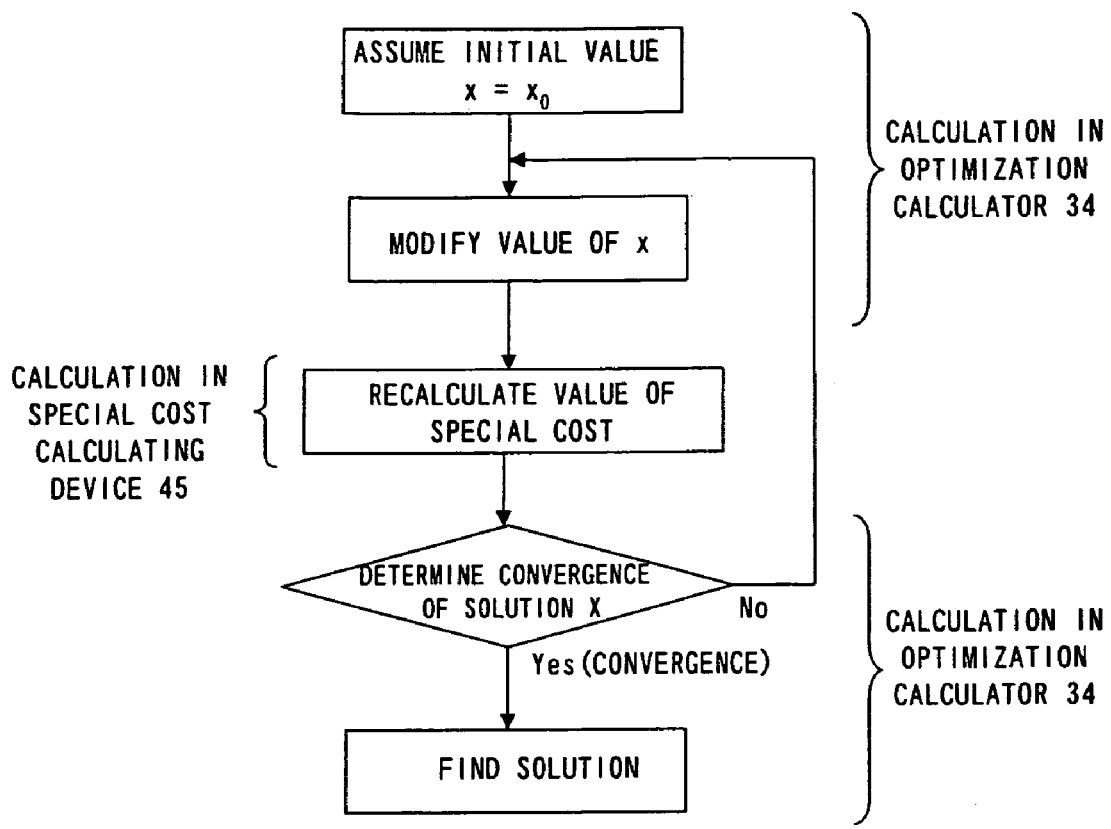
FIG. 8 is a flowchart showing another calculation method performed by the special-cost calculating device and the optimization calculator in the plant-operation-schedule optimization system according to the second embodiment.
Figure 9:
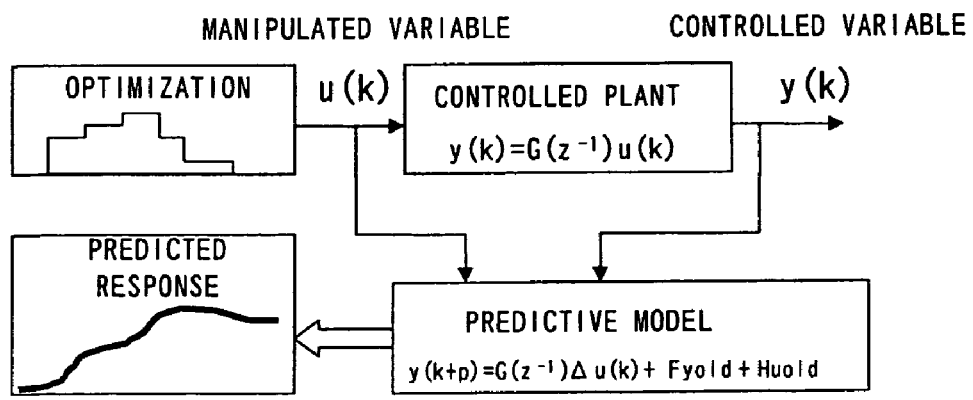
FIG. 9 is a schematic diagram showing a model predictive control method adopted in a known control system of plant operation.

Either of two methods shown in FIGS. 7 and 8 is used to set the special cost s.

In the method in FIG. 7, the calculation of the optimized operation schedule is also performed in the special-cost calculating device 45 in cooperation with the optimization calculator 34. The special-cost calculating device 45 calculates the special cost n in cooperation with the optimization calculator 34 after the optimization calculation from the start time (Ns) to the end time (Ne) is completed. An at-end condition of the outmost optimization calculation loop is set based on comparison of the rate of change of the value or the absolute value of the special cost with a threshold or based on determination of whether the number of calculations of the outmost optimization calculation loop exceeds a threshold.

In the method in FIG. 8, the value of the optimization variable x(k), that is, the value of the variable to be optimized, during a convergent calculation in the calculation of the optimized operation schedule is received as the optimization result k, and the special cost n is recalculated based on the value of the optimization result k. The special cost n is updated several times during the convergent calculation from the start time (Ns) to the end time (Ne) of the plant.

How the calculation of the optimized operation schedule of the plant 11 is displayed in the operation-state specification section 66 in the data inputting device 33 in FIG. 5 will now be described.

Symbols (⊚, ○, and X) for every time of day, selected by the user of the plant, are processed in the optimization calculator 34 in the following manner.

⊚: The values of the binary variables relating to the startup and shutdown, shown in Expressions (9) to (17), are determined by the optimization.

○: The values of the binary variables relating to the startup and shutdown, shown in Expressions (9) to (17), are fixed to one and related optimization variables are fixed to one so as to have a specified load.

X: The values of the binary variables relating to the startup and shutdown, shown in Expressions (9) to (17), are fixed to zero.

The example in FIG. 5 is expressed using the variables in Expressions (9) to (17) as follows:

$\delta_1=0$ (value at 2:00)
$\delta_2=1$ (value at 2:00)
$\delta_1=0$ (value at 3:00)
$\delta_2=1$ (value at 3:00)
$MW_2=100$ (value at 2:00)
$MW_2=100$ (value at 3:00)
No specification at 0:00 and 1:00

The optimization calculation satisfying the operation schedule specified by the user of the plant by using the symbols (⊚, ○, and X) can be realized in the manner described above.

In the plant-operation-schedule optimization system 10A according to the second embodiment of the present invention, shown in FIGS. 3 to 8, the provision of the mode selection expression setter 49 in the operation-schedule calculating unit 30 permits use of a flag, for example, the binary variables $\delta on_i$ and $\delta off_i$ in Expressions (16) and (17), corresponding to the change in the operation mode $\delta_i$ in the optimization calculator 34. In addition, the provision of the special cost setter 46 allows the optimization calculator 34 to include the special costs, for example, the startup cost constant $d_i$ and the shutdown cost constant $e_i$ in Expressions (12) and (13), which are accommodated to the change in the operation cost, in the optimization calculation.

Accordingly, the optimized operation schedule in which the operation cost is minimized while allowing for the change in the operation mode can be calculated.

The provision of the special-cost calculating device 45 allows the values, for example, the startup cost constant $d_i$ and the shutdown cost constant $e_i$ in Expressions (12) and (13), to be varied with the optimization variable x(k) of an actual operation, instead of being processed as fixed constants, so that more accurate calculation of the operation cost and the operation schedule can be realized.

Since the start time of the actual plant 11 is different in accordance with the pressure or temperature of the plant items or the startup method, a dedicated calculation device capable of performing detailed calculation may be provided in the plant-operation-schedule optimization system 10A. The use of the special-cost calculating device 45, which is a dedicated calculation device, in addition to the optimization calculator 34, allows a more accurate operation cost and operation schedule to be calculated in a short period of time.

The provision of the data inputting device 33 shown in FIG. 4 allows the future operation planned value necessary for the calculation of the operation schedule to be simply input.

The provision of the interpolation section 59 in the data inputting device 33 eliminates the need for the user of the plant to input all the data, thus saving the efforts of the user.

The provision of the pattern selection section 61 in the data inputting device 33 eliminates the need to input the patterns provided in the pattern selection section 61. It is sufficient for the user to select a pattern from the provided patterns. Furthermore, selecting similar operation patterns and then modifying the values displayed in the operation-planned-value input section 58 eliminates the need for the user to input all the values.

The provision of the graph display section 60 in the data inputting device 33 allows the user to check the values input in the operation-planned-value input section 58 in the form of a graph, so that any input errors can be easily found.

The provision of the data inputting device 33 shown in FIG. 5 allows the future operation state of the plant to be taken into consideration to calculate an accurate operation schedule.

Since the future startup and shutdown of the plant or the loads during the operation can be specified with the operation-state specification section 66, the operation constraints of the plant can be allowed for to calculate an accurate operation schedule.

Although the power plant, such as the combined cycle power plant, the thermal power plant, or the atomic power plant, is exemplified as the plant to be controlled in the plant-operation-schedule optimization system and method of the present invention, the plant to be controlled may be another kinds of the plants such as a geothermal power plant, a chemical plant, and a steel plant. Further, according to the present invention, the plant to be controlled includes not only a plant to be controlled but also plant items such as pump, actuator, or the like to be provided in the plant to be controlled. That is, the plant may be a plant item in any of the above various plants.

Although the plant-operation-schedule optimization system having the data processing unit is exemplified in the second embodiment of the present invention, the data concerning the future operation planned value supplied from the data inputting device and the operation data indicating the quantity of state of the plant, supplied from the operation control system, may be directly supplied to the optimization calculator in the operation-schedule calculating unit.

It will be further understood by those skilled in the art that the foregoing description is of the preferred embodiments of the present invention and that various changes and modifications may be made to the invention without departing from the spirit and scope thereof.

What is claimed is:

1. A plant-operation-schedule optimization method of calculating an optimized operation schedule having a cost evaluation function based on a characteristic model, an operation constraint, and operation planned values from the present to the future of at least one plant to be controlled,
wherein an operation mode variable meaning a kind of an operation mode of the plant is included as one of independent variables in the calculation of the operation schedule optimization, an operation pattern determined in advance according to the operation mode variable is set as an operation constraint, and the calculation of the operation schedule optimization of the plant is performed such that an operation cost for every operation mode or an operation cost when the operation mode is changed is minimized in the cost evaluation function.

2. The plant-operation-schedule optimization method according to claim 1, wherein the kind of the operation mode, the operation pattern, and the operation cost according to the operation mode of the plant to be controlled is stored in a database separated from an optimization calculator, and the database is referred to in the calculation of the operation schedule optimization of the plant in the optimization calculator.

3. The plant-operation-schedule optimization method according to claim 1, wherein the optimized operation pattern in a specific operation mode and the operation cost in the optimized operation pattern are calculated by optimization calculation using a model of the plant to be controlled, and the database storing the kind of the operation mode, the operation pattern, and the operation cost according to the operation mode is updated with the calculated optimized operation pattern and operation cost.

4. A plant-operation-schedule optimization system comprising:
a data inputting device transmitting a future operation planned value of at least one plant to be controlled;
an operation-data inputting device transmitting operation data concerning the plant; and
an operation-schedule calculating unit receiving the operation planned value and the operation data concerning the plant from the data inputting device and the operation data inputting device, respectively, to calculate an optimized operation schedule of the plant,
wherein the operation-schedule calculating unit includes:
an optimization calculator calculating the operation schedule optimization; and
a database storing the kind of an operation mode, an operation pattern, and an operation cost according to the operation mode of the plant, and the data stored in the database is referred to in the calculation of the optimized operation schedule in the optimization calculator.

5. The plant-operation-schedule optimization system according to claim 4, further comprising:
a data processing unit processing optimization result obtained in the calculation of the operation schedule optimization in the optimization calculator is electrically connected to the operation-schedule calculating unit, and
wherein the data processing unit includes:
a data storage storing the optimization result supplied from the optimization calculator; and
a data selector selecting data required for the optimization calculation in the operation-schedule calculating unit from the data stored in the data storage to output the selected data as optimization input data.

6. The plant-operation-schedule optimization system according to claim 5, wherein the data processing unit includes a data communication device receiving the operation data concerning the plant to be controlled from an operation control system for operating and controlling the plant, and the data communication device receives the optimization result from the data storage and outputs an operation schedule optimization signal to the operation control system.

7. The plant-operation-schedule optimization system according to claim 5, wherein the data processing unit includes a data drawer reading the optimization result stored in the data storage to draw the optimization data, and a display device displaying the data based on a drawing signal supplied from the data drawer.

8. The plant-operation-schedule optimization system according to claim 4, wherein the data inputting device includes a planned-value input section in which the future operation planned value is input, and an interpolation section for calculating an interpolation value of the input operation planned value.

9. The plant-operation-schedule optimization system according to claim 4, wherein the data inputting device includes a planned-value input section in which the future operation planned value is input, and a graph display section displaying the input operation planned value in a graph.

10. The plant-operation-schedule optimization system according to claim 4, wherein the data inputting device includes an operation-state specification section in which the future operation planned value of each unit in the plant to be controlled and/or an item in the unit is input.

11. The plant-operation-schedule optimization system according to claim 4, wherein the operation-data inputting device includes a data collecting unit collecting the operation data indicating the quantity of state of the plant to be controlled, and a data communication unit supplying the collected operation data to a data storage.

12. The plant-operation-schedule optimization system according to claim 4, wherein the operation-schedule calculating unit includes:
a characteristic expression setter setting a characteristic expression of the plant to be controlled or an operating condition and outputting the set characteristic expression;
a constraint expression setter setting a constraint expression, relating to an upper or lower limit or the rate of change of the plant, and outputting the set constraint expression;
a special cost setter setting a special cost and outputting the set special cost;
a mode selection expression setter setting a mode selection expression used for determining and selecting the operation mode of the plant and outputting the set mode selection expression;
a total-cost computation expression setter setting a total cost expression used for calculating a total cost of the operation of the plant and outputting the set total cost expression;
an optimization ancillary-data inputting device setting the value of a variety of data required for the optimization calculation in the operation-schedule calculating unit and outputting the set value as optimization ancillary data;
an optimization ancillary-data storage receiving and storing the optimization ancillary data supplied from the optimization ancillary-data inputting device and outputting the stored data as the optimization ancillary data if required; and
an optimization calculator calculating an optimized operation schedule having a minimum cost evaluated with the total cost expression based on the characteristic expression supplied from the characteristic expression setter, the constraint expression supplied from the constraint expression setter, the special cost supplied from the special cost setter, the mode selection expression supplied from the mode selection expression setter, the total cost expression supplied from the total-cost computation expression setter, and the optimization ancillary data supplied from the optimization ancillary-data storage, and the optimization calculator supplies an optimization result calculated in the calculation of the optimized operation schedule to a data processing unit.

13. The plant-operation-schedule optimization system according to claim 12, wherein the operation-schedule calculating unit has an externally-attached special-cost calculating device calculating the special cost, including a startup cost, a shutdown cost, or a standby cost, based on the optimization result supplied from the optimization calculator, and the special-cost calculating device supplies the calculated special cost to the special cost setter, and the special cost setter supplies the received special cost to the optimization calculator.

* * * * *